(12) United States Patent
Fitzgibbon

(10) Patent No.: US 6,847,178 B2
(45) Date of Patent: Jan. 25, 2005

(54) METHOD AND APPARATUS FOR DYNAMIC BRAKING OF A BARRIER OPERATOR

(75) Inventor: James J. Fitzgibbon, Batavia, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 0 days.

(21) Appl. No.: 09/965,311

(22) Filed: Sep. 27, 2001

(65) Prior Publication Data
US 2003/0057905 A1 Mar. 27, 2003

(51) Int. Cl.[7] ................................................. H02P 3/18
(52) U.S. Cl. ........................................ 318/375; 318/381
(58) Field of Search ................................ 318/375–381, 318/757–762

(56) References Cited

U.S. PATENT DOCUMENTS 4,698,622 A * 10/1987 Goto et al. .................. 318/261
6,175,204 B1 * 1/2001 Calamatas ................... 318/375
6,278,249 B1   8/2001 Fitzgibbon et al.

OTHER PUBLICATIONS

International Search Report, dated Mar. 19, 2003, in PCT application PCT/US02/30768.

* cited by examiner

Primary Examiner—Khanh Dang
(74) Attorney, Agent, or Firm—Fitch, Even, Tabin & Flannery

(57) ABSTRACT

A method and apparatus for controlling a barrier movement operator comprising a controller that dynamically controls barrier operator braking to electronically slow, stop or reverse the motor in the barrier operator controller. The apparatus includes a source of electrical power for providing the necessary power to operate the apparatus, a converter for supplying power to a DC motor, and a controller for enabling dynamic braking of the movable barrier operator using electronic braking of the electric motor. The dynamic braking of the motor gradually slows movement of the barrier operator, thereby reducing forces acting on the motor and on the barrier.

19 Claims, 5 Drawing Sheets

METHOD AND APPARATUS FOR DYNAMIC BRAKING OF A BARRIER OPERATOR

BACKGROUND OF THE INVENTION

The present invention relates generally to dynamic braking of D.C. motors and, more particularly, to a motor control system for dynamically braking a motor in a barrier movement operator.

Most generally available barrier operators when stopped in mid-travel come to a halt very abruptly. This is most easily observable, for example, when a garage door opener is moving a door from an opened to closed position and is reversed or stopped, such as when infrared sensors detect an obstruction or when a control button for stopping or reversing the barrier operator is depressed. The garage door, which can weigh upwards of 250 pounds, can be seen to shudder to a stop. During a reversal operation, the barrier jitters and bounces, causing the chain track and the entire housing of the barrier operator to shake in its moorings. The sheer weigh and velocity of the door, combined with having to reverse or stop suddenly, puts a strain on the entire system.

The above phenomenon is caused by the manner in which the barrier movement operator is controlled. Common DC control arrangements consist of a relay or other switching apparatus to control the applied DC potential, and some form of power regulator to connect portions of power from a DC supply to the motor. The variable power connection may consist of something as simple as a rheostat or something more complex such as a semiconductor switching arrangement. Although the power couplers may vary in sophistication, the system is basically a source of DC power coupled by a regulator to the motor or other power using device.

Referring to FIG. 1, a typical barrier movement operator is illustrated. As shown, the operator includes an AC line source 10 for providing power to the system. The AC voltage from the AC line source 10 is filtered by a filter 12 then converted into DC voltage by a rectifier 14 for use by a load, such as a DC motor 16. The barrier operator is slowed to a stop at the limit by a controller 18 that pulses transistor Q1 20. Transistor Q1 20, as used herein is a N-channel field effect transistor (FET). However, other types of transistors may also be used with appropriate circuit modifications performed by those skilled in the art. Relay1 22 and Relay2 24 control the direction of the motor. Pulsing transistor Q1 20 causes the voltage being applied to the motor to be turned off and on and has the effect of reducing the supply voltage. Once supply voltage is reduced or eliminated, the friction in the system stops the door travel. A particular disadvantage of such a system is that the barrier operator is stopped at a desired position only when the rate of frictional stopping is greater than the desired electrical stopping.

Turning now to FIG. 2, the operator is shown wherein the rate of frictional stopping is greater than the desired electrical stopping. The line voltage 30 supplied by the AC line source 10 (FIG. 1) is passed through the full wave rectifier 14 to produce a fully rectified signal 32 for use by the motor 16. When the operator 110 is commanded to stop, the controller 18 pulses the power 34 being supplied to the motor 16, thereby reducing the voltage to the motor and causing the motor to stop. The frictional rate of stopping is adequate because the voltage 36 across the motor 16, when the motor is acting as a generator, is lower than the peak voltage 38 of the power supplied from the rectifier 14. Thus, the door comes to a stop in the desired position.

In contrast, referring to FIG. 3, it can be seen that problems arise in those instances where the inertia of the barrier operator is so high that the rate of frictional stopping is slower than intended. As above, the rectified voltage 32 is supplied to the motor 16. When the operator 110 receives a stop command, the controller 18 provides a pulsed voltage 34 to the motor 16, thereby having the effect of reducing the supply voltage. However, in this instance, the frictional rate is inadequate because the voltage 40 generated by the motor 16, which is now acting as a generator, is greater than the peak voltage 42 of the power supplied by the rectifier 14. Thus, the barrier is unable to be stopped at the desired rate and the operator 110 cannot be stopped simply by pulsing the transistors. As such, in those instances where the barrier operator is unable to slow the movement of the barrier, stopping the operator in a panic situation must be accomplished by shorting the motor, or allowing the barrier to strike a physical limit, resulting in a very sudden stop. Unfortunately, such abrupt stops create high forces acting on the door and the operator, as described above, which result in undue wear and tear on the operator and high stresses on the barrier.

What is needed, therefore, is an operator controller for softening the deceleration of the operator and the door.

SUMMARY OF THE INVENTION

A method and apparatus for controlling an operator is described herein and provides a controller that dynamically controls barrier operator braking using one of several different methods to electronically slow, stop or reverse the motor. In one form, the apparatus includes a source of electrical power for providing the necessary power to operate the apparatus, a converter for supplying power to a DC motor, and a controller for enabling dynamic braking of the movable barrier operator using electronic braking of the electric motor to gradually slow movement of the barrier operator, thereby reducing forces acting on the motor.

According to a particular embodiment, an AC input signal is full wave rectified and supplied to gating circuitry coupled to the converter. The rectified signal is also used to provide power to a motor used in the movable barrier operator. The voltage applied to the motor is regulated through the use of software. The software controls the controller such that the controller, upon receiving a command to stop or reverse, reverses the direction of the power supply and pulses the power from the power supply to the motor at a predetermined rate. This results in a controlled stop or reversal of the barrier.

In another aspect, soft stopping and reversing of the barrier movement operator is achieved by adding electrical resistance to the motor. The electrical resistance may be present during all operation stages of the operator or may be configured such that the electrical resistance is active only when the barrier movement operator is given a stop or reverse command.

In still another aspect, a power amplifier is used to control the motor speed to enable soft stopping or reversal of the barrier movement operator. The power amplifier normally provides power to the motor as required during its normal operation of moving up or down. However, when the operator receives a stop or reverse command, the power amplifier absorbs the energy from the motor, reproduces it at a higher potential power and uses the stored power then to slow or stop the barrier operator in a controlled manner.

The invention as described, in any of its various aspects, reduces the abrupt stops and high forces acting on the door and the operator, thereby also reducing the wear and tear on the operator and barrier.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 4:
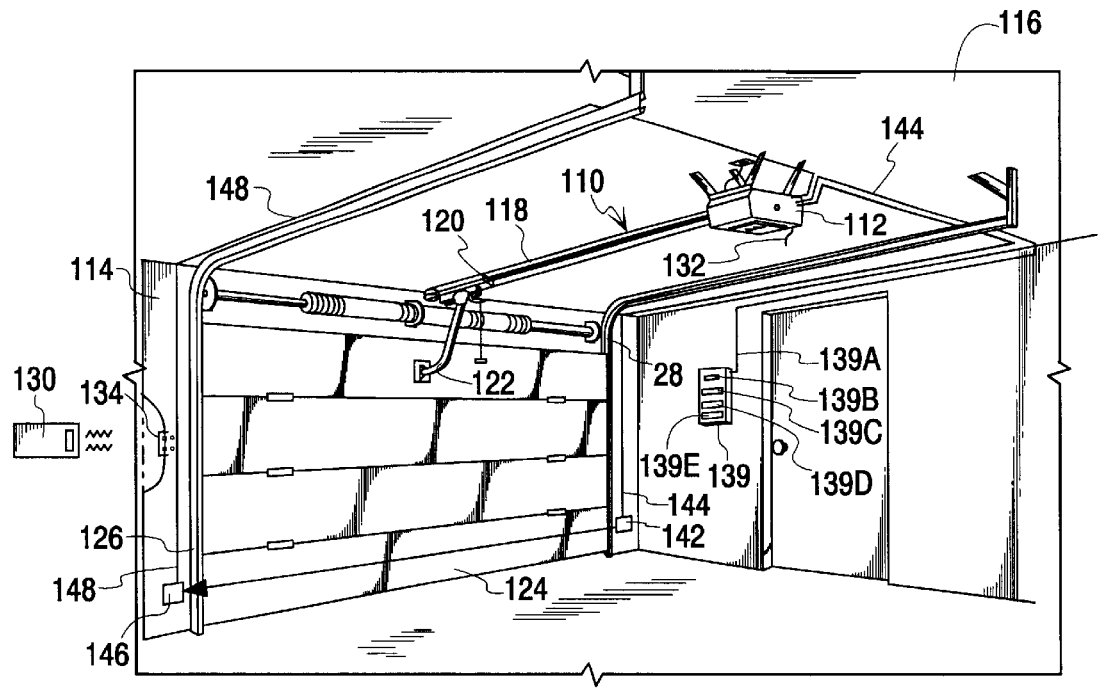
FIG. 4. Is a perspective view of a movable barrier operator using the motor controller described herein.

Referring now to the drawings and especially to FIG. 4, a movable barrier operator embodying the present invention is generally shown therein and identified by reference numeral 110. The movable barrier operator 110 includes a head unit 112 mounted within a garage 114 and is employed for controlling the opening and closing of the garage 114. More specifically, the head unit 112 is mounted to the ceiling 116 of the garage 114 and includes a motor 16 (FIG. 5) and a controller 18 (FIG. 5) for controlling how power is supplied to the motor 16. Extending from the head unit 112 is a rail 118 having a releasable trolley 120 attached thereto and an arm 122 extending from the trolley 120 to a multiple paneled garage door 124 positioned for movement along a pair of door rails 126 and 128. The movable barrier operator 110 transfers the garage door 124 between the closed position illustrated in FIG. 4 and an open or raised position, allowing access to and from the garage 114. The moveable barrier operator 110 may be a garage door operator as shown in FIG. 4, a gate operator, a tubular motor operator, etc.

The system of FIG. 4 includes a hand-held transmitter unit 130 adapted to send signals to an antenna 132 positioned on or extending from the head unit 112 and coupled to a receiver (not shown) located within the head unit 112. An external control pad 134 is positioned on the outside of the garage 114 having a plurality of buttons 135 thereon and communicates via radio frequency transmission with the antenna 132 and receiver of the head unit 112. A switch module 139 is mounted on a wall of the garage 114. The switch module 139 is connected to the head unit 112 by a pair of wires 139a. The switch module 139 includes a learn switch 139b, a light switch 139c, a lock switch 139d and a command switch 139e. Alternatively, the switch wired to the head unit 112 could be a simple on/off switch used to activate or stop the operation of the movable barrier. In addition, a barrier movement sensor, such as a motor RPM detector as described in U.S. Pat. No. 6,025,785 and incorporated by reference herein, may be monitored by the controller 18 to identify the speed and position of the motor and connected barrier.

An optical emitter 142 and an optical detector 146 are coupled to the head unit 112 by a pair of wires 144 and 148, respectively. The emitter 142 and detector 146 are used to satisfy the requirements of Underwriter's Laboratories, the Consumer Product Safety Commission and the like that require that garage door operators sold in the United States must, when in a closing mode and contacting an obstruction having a height of more than one inch, reverse and open the door in order to prevent damage to property and injury to persons. The controller 18 (FIG. 5) for the movable barrier operator 110 responds to the various inputs by starting and stopping the motor 16 (FIG. 5), which is used to move the door.

Figure 1:
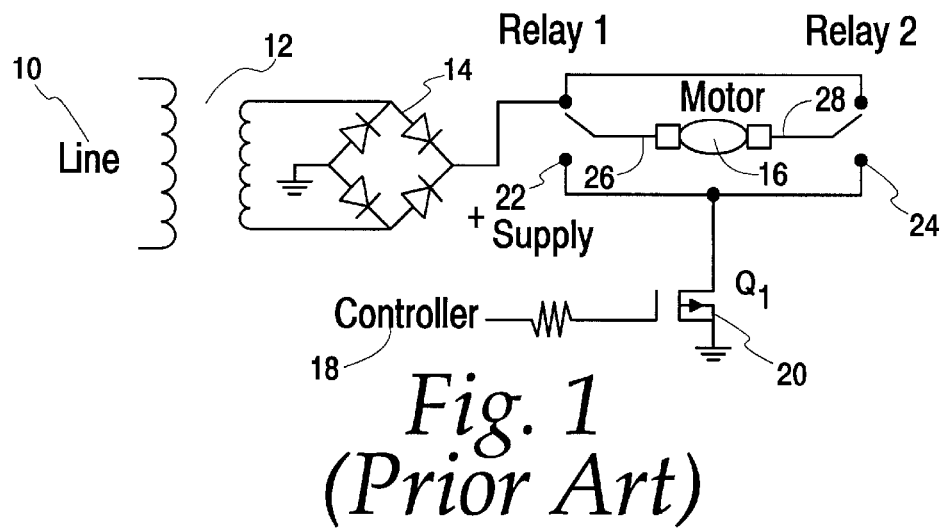
FIG. 1 is a schematic view of a prior art movable barrier operator controller.
Figure 2:
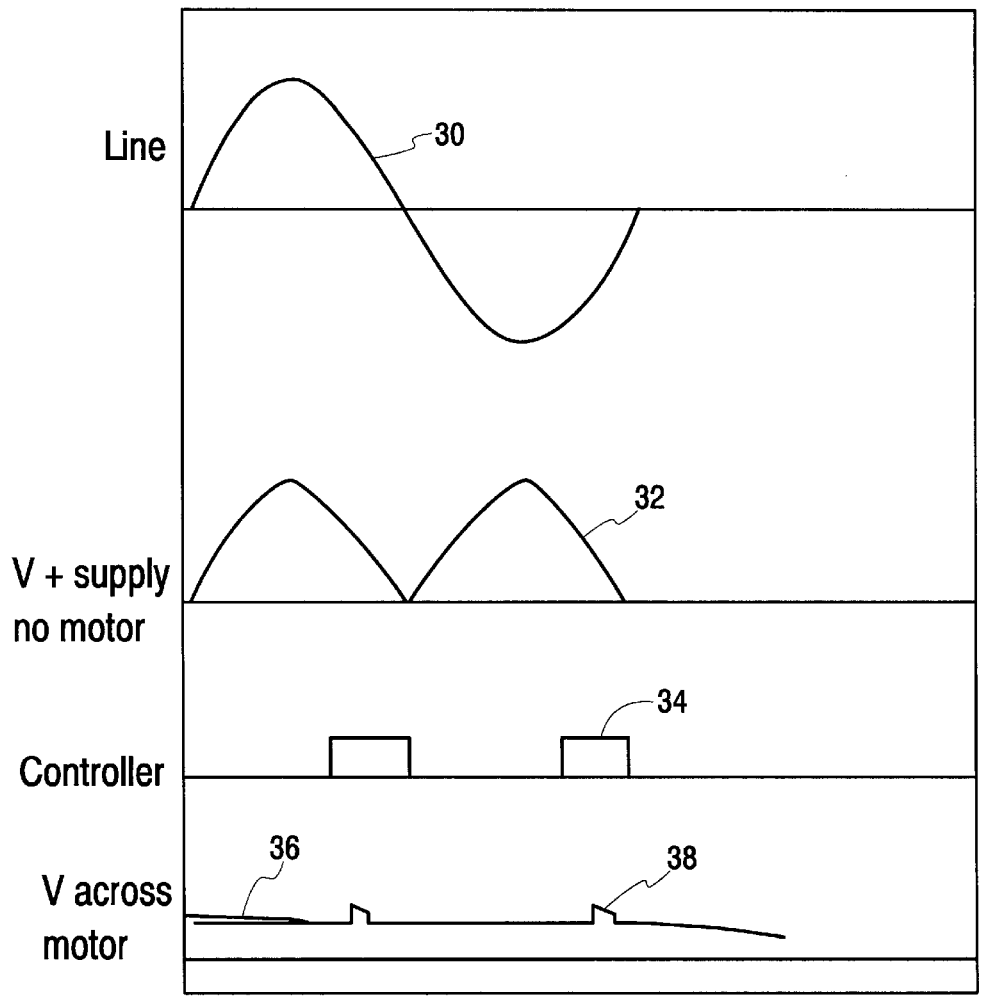
FIG. 2 is a graph illustrating the voltages in the barrier operator of FIG. 1 in a first operating mode.
Figure 3:
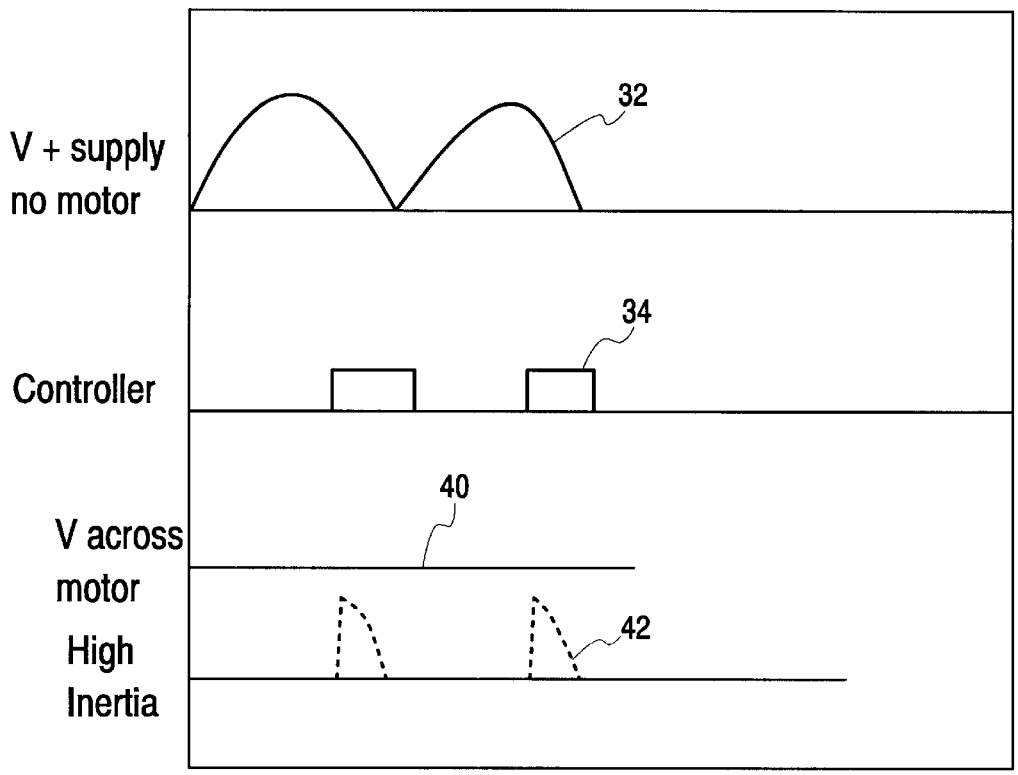
FIG. 3 is a graph illustrating the voltages in the barrier operator of FIG. 1 in a second operating mode.
Figure 5:
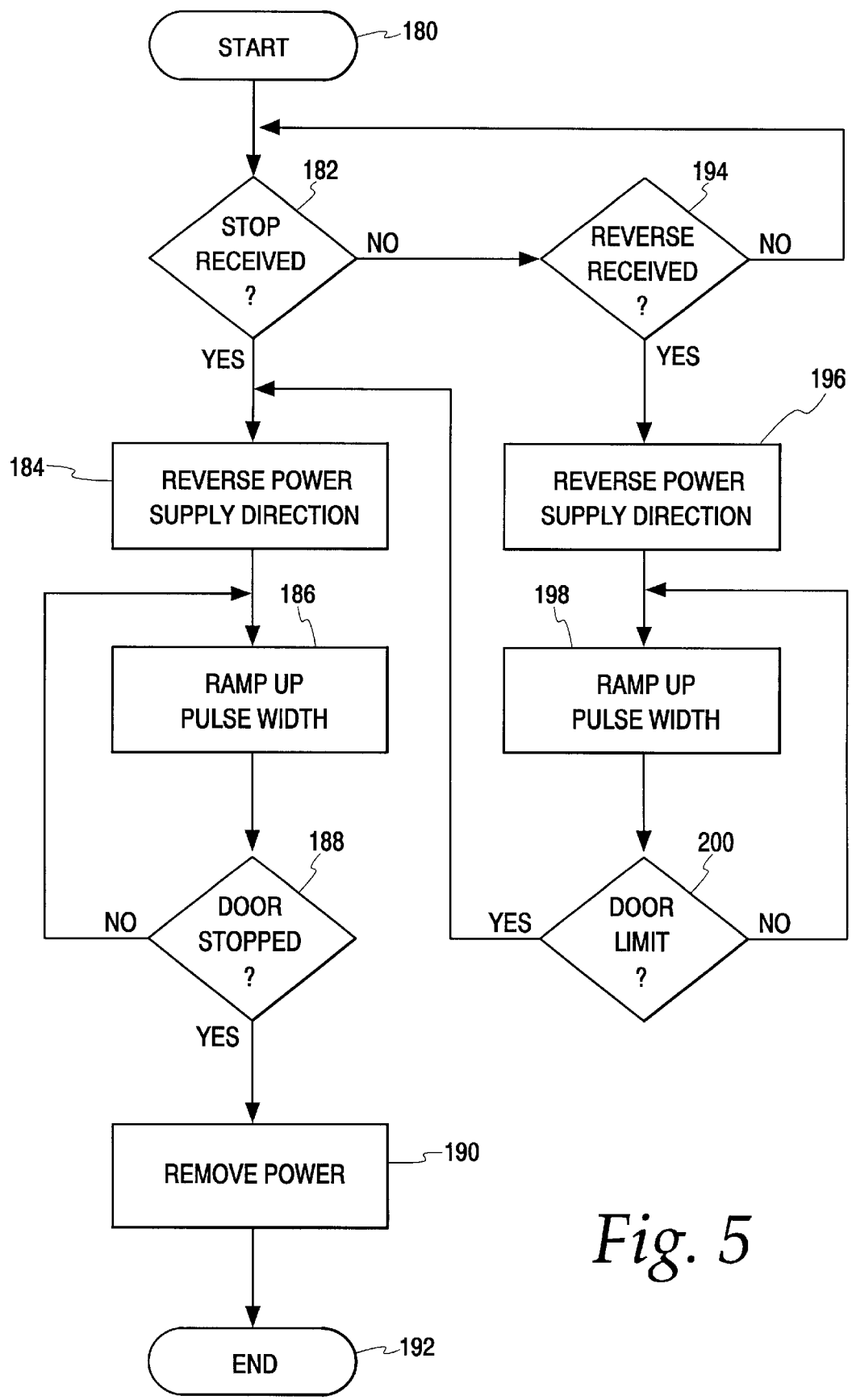
FIG. 5 is a block diagram of a novel method for controlling the barrier operator of FIG. 1.

Referring to FIGS. 1 and 5, in a particular aspect of the present invention, a low cost method for electronically slowing the motor 16 is described. Instead of pulsing the power to the motor 16 and relying on friction to bring the operator 110 to a stop, a software program, during the slowdown and the slowdown and reverse functions, reverses the power supply direction and ramps up or increases the width of applied pulses of voltage.

Referring first to FIG. 1, the operator 110 includes an AC line power source 10, a filter 12 for filtering the AC line power and a rectifier 14 for providing a DC voltage to the motor 16. Relay1 22 and Relay2 24 operate under the control of controller 18 and are provided to change the rotational direction of the motor 16 by effectively reversing the power supply direction. For example, closing Relay2 24 and opening Relay1 22 causes the motor 16 to operate in a first direction. Closing Relay1 22 and opening Relay2 24 causes the motor to turn in the opposite direction, since the current flow through the motor armature 26, 28 is reversed. It is to be noted that when the power supply direction is reversed, the motor 16 does not suddenly and immediately reverse directions. Rather, the rotation of the motor 16 in the first direction gradually slows, stops and then reverses direction at an increasing speed. In contrast, shorting the motor armature 26, 28 results in an undesirable instantaneous and jarring stop.

As described above, the operator 110 shown in FIG. 1 in normal operation is slowed to a stop at the limit by the controller 18, which pulses transistor Q1 20. The pulsing of transistor Q1 20 causes the power being applied to the motor 16 to be turned off and on. This has the effect of reducing the supply voltage to the operator 110, thereby causing the motor 16 to slow to a stop. As mentioned above, however, this type of stopping is not effective in all situation, such as when the rate of frictional stopping is inadequate to stop the door at a desired position.

As particularly shown in FIG. 5, software control is used to softly slow or stop the operator. Step 180 is the entry point for the controller software. In step 182, the operator 110 determines whether a stop command has been received. The stop command may be received from a variety of sources, such as from the hand held transmitter 130, the control pad 134 or the switch module 139. When a stop command is received, the controller 18 reverses the power supply direction in step 184 by changing the sate of Relay1 22 and Relay2 24 and ramps up the pulse width in step 186 via transistor 20. In step 188, the operator 110 determines whether the garage door 124 has stopped by reading the motor RPM sensor. If the garage door 124 has not stopped, then the program returns to step 186 and continues to ramp up the pulse width as the garage door 124 continues to move. However, if the garage door 124 is stopped in step 188, the controller 18 removes power to the motor 16 in step 190. The program then ends in step 192.

If in step 182 a stop command was not received, then in step 194 the operator 110 determines whether a reverse command was received. The reverse command may be sent from any of the sources that are able to send a stop command (as described above), or if the garage door 124 encounters an obstacle when closing. If a reverse command is received, then in step 196 the barrier operator 110 reverses the power supply direction using Relay1 22 and Relay2 24. The controller 18 ramps up the pulse width in step 198. In step 200 the operator 110 determines whether the garage door has reached a maximum desired travel limit. If the limit has not been reached, the controller 18 continues to ramp up the pulse width as the garage door 124 continues moving. If, however, in step 200 the door limit has been reached, then the program jumps to step 184 and executes the remainder of the program, as described above. A particular advantage of the described control system is the low cost of implementation, since hardware modifications do not need to be made to the barrier movement operator.

Figure 6:
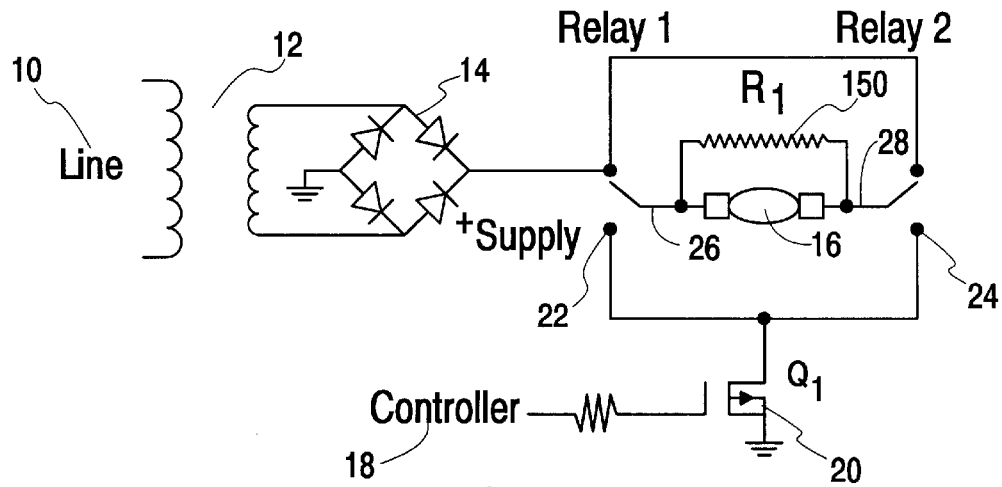
FIG. 6 is a schematic diagram of a resistor based barrier operator controller in a particular aspect of the invention.

Turning now to FIG. 6, in another aspect, the barrier movement operator 110 of the present invention is implemented using a dynamic braking resistor to electrically increase the resistance to movement on the motor 16 to enable the barrier movement operator 110 to slow to a stop. The operator 110 includes an AC line power source 10, a filter 12 for filtering the AC line power, a rectifier 14 for converting the filtered then power into a DC voltage for use by the motor 16 and Relay1 22 and Relay2 24 for controlling motor direction. Dynamic braking resistor R1 150 is added across the armatures 26, 28 of the motor 16. When the operator 110 receives a command to stop, the controller 18 turns off transistor Q1 20. By doing so, supply voltage from the rectifier 14 does not reach the motor 16. At that point, voltage generated by the motor 16 during its rotation acts through resistor R1 150, which behaves like an increase in the friction of the system, thereby causing the motor 16 to come to a controlled stop. The value of resistor R1 150 is chosen to have a rate of frictional stopping faster than the rate of electrical stopping to enable the door to stop at the desired position. A particular advantage of such a system is its low cost and ease of implementation.

Figure 7:
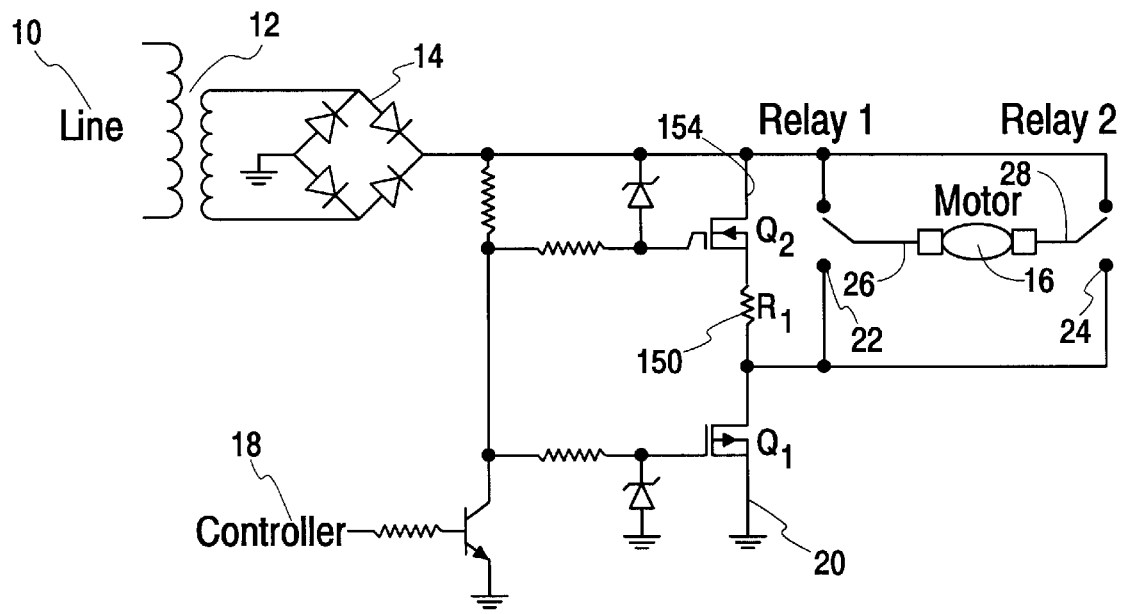
FIG. 7 is a schematic diagram of the resistor based barrier operator controller of FIG. 5 in another aspect.

Referring now to FIG. 7, the embodiment of FIG. 6 is extended using a more efficient design. As shown in FIG. 6, resistor R1 150 is present in the circuit at all times and generates heat even when the operator 110 is operating in its normal mode of operation. As a result, the drive circuit for motor 16 must supply power in its normal mode of operation to drive the motor and generate heat through resistor R1 150. As shown in FIG. 7, however, transistor Q2 154, which may be a P-channel FET among others, is used to eliminate the increased power consumption and heat generation by applying resistor R1 150 only when the barrier movement operator 110 is commanded to stop or reverse.

The barrier operator 110 includes the AC line power 10, filter 12, rectifier 14, motor 16 having armatures 26, 28 and Relay1 22 and Relay2 24 as described above. In this case, however, when the barrier movement operator 110 is in its normal mode of operation, and the motor 16 is operating to move the barrier up or down, transistor Q2 154 is on and transistor Q1 152 is off. This renders resistor R1 150 effectively inactive. Therefore, there is no heat generated through resistor R1 150 when the motor 16 is operating in a normal powered mode.

When the operator 110 receives a stop command, the controller 18 turns on transistor Q1 152. This prevents the motor 16 from receiving voltage from the rectifier 14. At the same time, when the controller 18 turns on Q1 152, it also turns off transistor Q2 154. As a result, transistor Q2 154 applies resistor R1 150 across the armature 26, 28 of the motor 16. This causes the motor 16 to slow to a soft, controlled stop due to the increased electrical friction as described above. Thus, a particular advantage of the present aspect of the invention is the ability of the system to generate electrical friction to help the barrier movement operator slow to a stop, while at the same time decreasing the heat generated by resistor R1 150 in all operating modes of the operator 110 and decreasing the power consumption of the system when the motor 16 is being powered.

Figure 8:
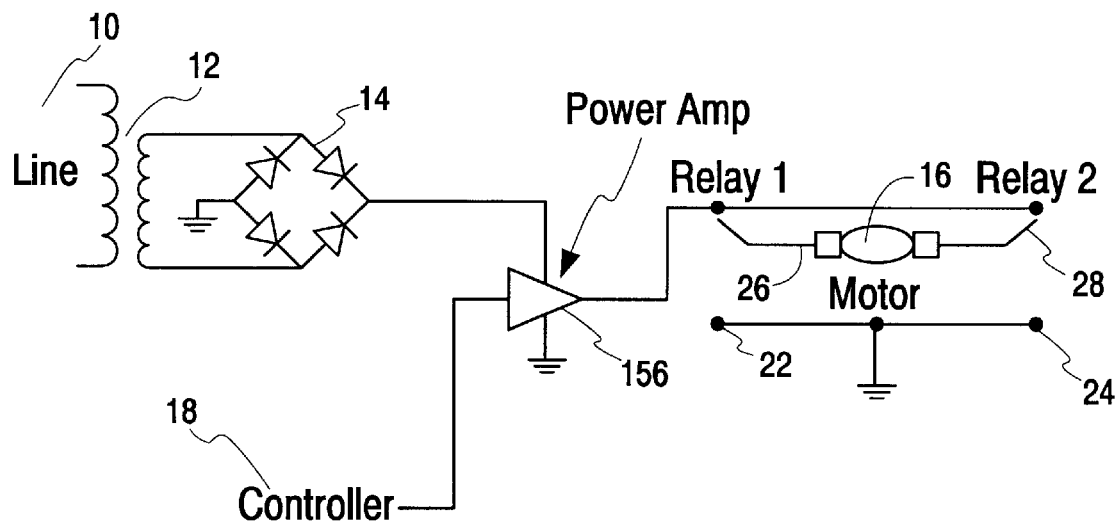
FIG. 8 is a schematic diagram of a power amplifier based barrier operator controller in another embodiment of the invention.
Figure 9:
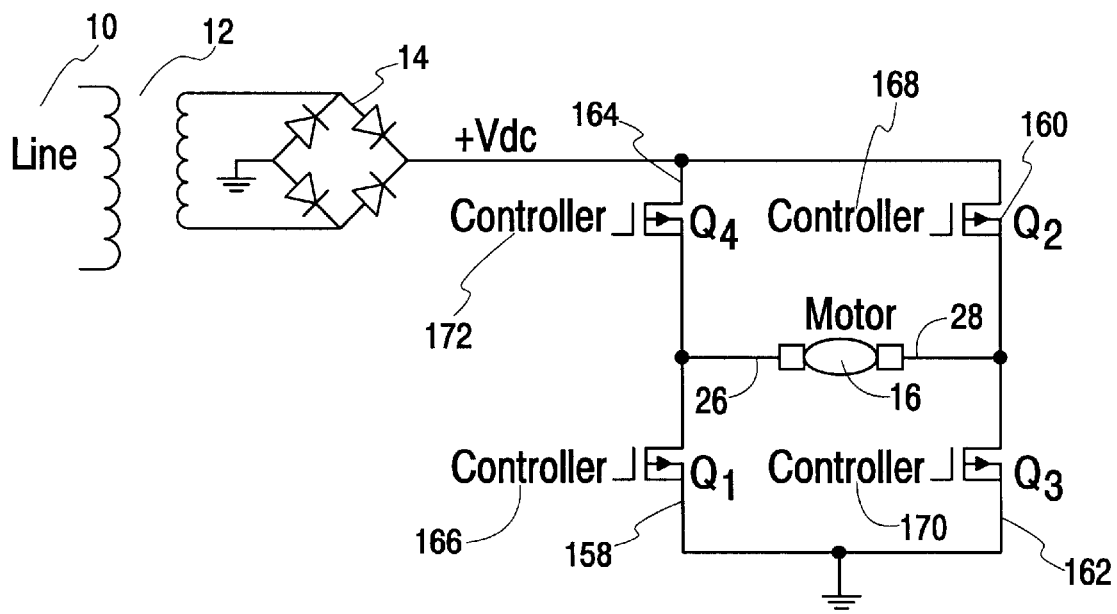
FIG. 9 is a schematic diagram of a transistor based barrier operator controller in another embodiment of the invention.

Referring to FIG. 8, another aspect of the dynamic braking system of the barrier operator 110 is shown wherein the greatest amount of control over the operation of the barrier movement operator 110 may be exerted. This aspect of the invention, much like the embodiment described above, includes a barrier operator 110 having AC line power 10, filter 12, rectifier 14, Relay1 22 and Relay2 24 and motor 16. In addition, a power amplifier 156 is provided to control the voltage being supplied to the motor 16. The power amplifier 156 receives voltage from the rectifier 14 and supplies voltage to the motor 16 during the barrier movement operator's normal mode of operation. During a stop or reversal operation, the controller 18 reverses Relay1 22 and Relay2 24 and drives up the voltage from the power amplifier 156. Current flow from the motor, which is now acting as a generator, opposes the positive supply voltage from the rectifier 14, thereby reducing the supply current. Thus, better control of motor speed is achieved and the motor 16 is brought to a controlled stop Referring now to FIG. 9, in another aspect of the present invention, motor direction and braking is fully controlled by electronic means through the use of multiple control systems and transistors acting on the motor armatures 26, 28. As described above, the barrier operator 110 includes the AC line power supply 10, filter 12, rectifier 14 and motor 16, which has armatures 26, 28. In the present embodiment, the armature 26 is connected to the voltage source through transistor Q4 164, when the barrier is to be moved. Transistor Q4 164 is individually controlled by a controller 172. The motor armature 26 may also be connected to ground through transistor Q1 158. Transistor Q1 158 is also individually controlled by a controller 166. Similarly, motor armature 28 is connected to the voltage supply through transistor Q2 160. The controller 168 controls the state of transistor Q2 160. The motor armature 28 may also be connected to ground through transistor Q3 162. Once again, a controller 170 is used to individually control transistor Q3 162. It is to be noted that although multiple controllers have been described for purposes of the foregoing example, similar control function may be achieved using a single controller, such as controller 18, and multiple control lines.

In operation, the controller 166 and the controller 168 turn on transistors Q1 158 and Q2 160, thereby causing the motor 16 to turn in a first direction. If the motor 16 needs to be braked, transistors Q1 158 and Q3 162 or, alternatively, transistors Q4 164 and Q2 160, can be turned on by their respective controllers. In addition, the controller 170 and the controller 172 may turn on transistors Q3 162 and Q4 164 to cause the motor 16 to turn in a second direction. A second braking system using pulsed shorting of the motor also may be implemented by turning on one of the four transistors and using a diode in the opposite leg to clamp the generator action/speed of the motor.

Thus, it is apparent that there has been provided, in accordance with the invention, a power controller that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A movable barrier operator comprising:
   a DC power source for producing a positive and negative output voltage;
   a DC electric motor having first and second terminals for rotating in a first direction when the positive and negative output voltages are separately connected to the first and second terminals in a first sense and for rotating in a second direction when the positive and negative output voltages are separately connected to the first and second terminals in a second sense;
   a transmission for connecting the DC motor to a barrier to be moved;
   a controller for moving the barrier by connecting DC power to the DC motor in the first sense and for slowing movement of the barrier by connecting DC power to the motor in the second sense.

2. A movable barrier operator in accordance with claim 1 comprising a power amplifier to connect DC power to the motor and the controller controls the power amplifier to connect varying DC power to the DC motor.

3. A movable barrier operator in accordance with claim 1 comprising a pulse width modulating circuit coupling the DC power source to the DC motor and the controller sends control signals to the pulse width modulating circuit to connect varying DC power to the DC motor.

4. A movable barrier operator in accordance with claim 1 wherein the controller responds to command to stop barrier movement by reversing the sense of connected DC power connected to the DC motor.

5. A movable barrier operator in accordance with claim 4 comprising apparatus for regulating the amount of DC power applied to the DC motor.

6. A movable barrier operator in accordance with claim 5 wherein the apparatus for regulating the amount of DC power comprises a pulse width modulation circuit.

7. A movable barrier operator in accordance with claim 5 wherein the amount of DC power comprises a power amplifier.

8. A movable barrier operator in accordance with claim 1 wherein the controller responds to an indication to reverse a direction of barrier movement by reversing the sense of connected DC power connected to the DC motor.

9. A movable barrier operator in accordance with claim 8 comprising apparatus for regulating the amount of DC power applied to the DC motor.

10. A movable barrier operator in accordance with claim 8 wherein the apparatus for regulating the amount of DC power comprises a pulse width modulation circuit.

11. A movable barrier operator in accordance with claim 9 wherein the apparatus for regulating the amount of DC power comprises a power amplifier.

12. A method of controlling a barrier movement operator comprising a DC motor for receiving DC power of a selected polarity for controlling a movement of the barrier, the method comprising
    connecting a first polarity of DC power to the DC motor;
    receiving a command to stop movement of the barrier;
    reversing the polarity of the DC power connected to the DC motor in response to the receiving step.

13. A method in accordance with claim 12 comprising controlling the amount of power connected to the DC motor.

14. A method in accordance with claim 13 comprising controlling the amount of power connected to the DC motor after the step of reversing the polarity.

15. A method in accordance with claim 14 wherein the step of controlling the amount of power is performed in response to the receiving step.

16. A method of controlling a barrier movement operator comprising a DC motor for receiving DC power of a selected polarity for controlling a movement of the barrier, the method comprising
    connecting a first polarity of DC power to the DC motor to move the barrier in a first direction;
    receiving a signal directing movement of the barrier in a second direction, opposite to the first direction;
    in response to the receiving step, reversing the polarity of the DC power connected to the DC motor while the barrier is moving in the first direction.

17. A method in accordance with claim 16 comprising controlling the amount of power connected to the DC motor.

18. A method in accordance with claim 17 comprising controlling the amount of power connected to the DC motor after the step of reversing the polarity.

19. A method in accordance with claim 18 wherein the step of controlling the amount of power is performed in response to the receiving step.

* * * * *